Patented Dec. 24, 1935

2,025,539

UNITED STATES PATENT OFFICE 2,025,539

SYNTHETIC RESIN AND METHOD OF PREPARING THE SAME

Roy H. Kienle, Schenectady, N. Y., assignor to General Electric Company, a corporation of New York No Drawing. Application August 25, 1933, Serial No. 686,780

6 Claims. (Cl. 106—22)

The present invention relates to synthetic resins and methods of preparing the same. More specifically it is concerned with alkyd type resins which may be prepared in various degrees of flexability, which are relatively quick curing, oil-resistant and stable in character.

In a copending application of Safford, Serial No. 613,563 filed May 25, 1932, and assigned to the assignee of the present invention there are disclosed and claimed resinous compositions which are prepared by compounding in correct proportions semi-cured (or partially cured) and totally cured flexible alkyd resins. Such resinous compositions are capable of being extruded through shaped dies and worked on rubber compounding rolls like rubber. In fact, the compositions are rubber-like in character, their flexibility, resiliency and plasticity depending on the nature and amount of ingredients used in their preparation.

I have been able to materially improve the cure time, water resistance and general stability of this type of resinous composition by using instead of the semi-cured flexible alkyd resin portion a semi-cured resin prepared by reacting a phenol and an aldehyde in the presence of an alkyd resin catalyst in accordance with the disclosure in the copending application of Kienle and Schlingman, Serial No. 653,673, filed January 26, 1933, which application is also assigned to the assignee of the present invention. Moreover, I have been able to effect such results without any corresponding loss in such properties as flexibility and oil resistance of the products which is rather surprising since the addition of resins of the phenolic type would not be expected to yield such results normally.

In order that my invention may be more fully understood and practiced by those skilled in the art to which it pertains the following examples thereof are given it being understood that they are merely illustrative in nature.

Example 1

A flexible alkyd resin was prepared in the usual manner, for example in accordance with the disclosure in Kienle and Rohlfs Patent No. 1,897,260, by reacting glycerol, phthalic anhydride, glycol and adipic acid in proportions such that the mol ratio of glycol adipate to glycerol phthalate was 3:1, the acid number being 190–210. 29.1 parts by weight of this resin were dissolved in 37.4 parts by weight of phenol. 17.2 parts by weight of paraformaldehyde were then added and the ingredients cooked under reflux for about 3 hours. The temperature was allowed to rise slowly to 115° C., then to drop to about 105° C. At this point 13.3 parts by weight of dibutyl phthalate and 30 parts by weight of phthalic anhydride were added and the heating continued at 100 to 105° C. in the open until a cure of 25 seconds on a a 150° C. hot plate was reached. Upon pouring into a suitable container and cooling, the resin was ready for use.

In the above example the ratio of alkyd resin to phenolic resin was 35 to 65, that is the resinous composition contained 35% flexible alkyd resin. This ratio can vary from 20% to 80% and thus the flexibility of the resinous composition can be varied.

The resinous composition above prepared was in the semi-cured state. It was used in conjunction with a fully cured alkyd resin to prepare the final product. Using this semi-cured resin a product was prepared by milling together on heated rubber compounding rolls:

|  | Parts by weight |
|---|---|
| Semi-cured resin as above prepared (binder resin) | 20 |
| Granulated fully cured flexible alkyd resin prepared by reacting glycerol, phthalic anhydride, glycol and adipic acid (ratio 3.5 to 1 glycol adipate to glycerol phthalate) | 73 |
| Zinc stearate | 2 |

After sheeting, a tan, homogeneous plastic mass resulted which could be calendered, extruded or molded. When molded into sheets approximately ⅛" thick, a satisfactory cure was obtained using a temperature of 150° C. for one-half hour. A tough, flexible sheet resulted which was suitable for cutting oil-proof gaskets, washers, etc.

To illustrate the improvement obtained when a semi-cured resin of the type I employ herein as the binder resin is used instead of the ordinary semi-cured flexible alkyd resin, a comparison is made in the table below of some of the properties exhibited by a compound made in accordance with Example 1 and a similar compound made with semi-cured flexible alkyd resin.

|  | Compound of Example 1 | Same mix with B-stage flexible alkyd resin binder |
|---|---|---|
| 48-hour cold water test | 1.0–0.8% | 1.3% |
| Hot water test | 0.1% | 3.52% |
| Oil absorption | Nil | Nil |
| Tensile strength | 820 | 606 |
| Elongation | 200 | 202 |
| Cure time | ½ hr. at 150° C. | 24–28 hours at 150° C. |

The above table clearly shows how the curing time and water resistance are improved without adversely affecting other properties.

*Example 2*

An A-stage flexible alkyd resin was prepared in the usual manner using a ratio of 10 mols glycol adipate to 1 mol glycerol phthalate. The resin was cured at 180–200° C. to C-stage in a heated dough mixer, 10% lead oxide being added just at gelation.

Using the binder resin (semi-cured resin) prepared in Example 1 a plastic compound was mixed on heated rubber rolls using the following ingredients:

Parts by weight
Cured C-stage flexible alkyd resin _____ 78
Binder resin _____ 20
Zinc stearate _____ 2

A dark tan compound resulted. When pressed between platens at 150° C. for one-half hour this compound cured to a rubbery, flexible, tough sheet, resistant to oil, water and other similar agencies.

*Example 3*

A flexible alkyd resin was prepared as above using a ratio of 15 mols glycol adipate to 1 mol glycerol phthalate. It was cast into sheets, cured to C-stage and ground to a meal on rubber compounding rolls.

A plastic compound was made up using the following formula:

Parts by weight
C-stage flexible alkyd resin _____ 78
Binder resin of Example 1 _____ 20
Iron oxide _____ 2

All of the ingredients were thoroughly worked together on the rubber compounding rolls using a mixing temperature of approximately 100–125° C. When thoroughly mixed the mass was sheeted by cooling one roll and stripping.

The compound so prepared can be calendered, extruded and molded. When molded in ⅛" sheets a cure of ½ hour at 150–160° C. is satisfactory. A reddish rubbery, very flexible sheet results.

*Example 4*

A binder resin was prepared by dissolving in 8.25 parts by weight of phenol at about 90° C., 3.5 parts by weight of an A-stage flexible resin (prepared by using a mol ratio of 3.5 to 1 glycol adipate to glycerol phthalate), acid number about 200. When the resin was dissolved 4.25 parts by weight of paraform were added and the whole mass heated under reflux at a temperature between 105 to 125° C. After four hours of refluxing, 2.5 parts by weight of dibutyl phthalate and 0.65 parts by weight of phthalic anhydride were added and the resin further cooked down under reduced pressure at a temperature of 90 to 100° C. to a thick syrup having a 20 second cure on a 150° C. hot plate.

A compound was prepared from:

Parts by weight
15:1 C-stage flexible alkyd resin _____ 88
Binder resin (as above prepared) _____ 10
Iron oxide _____ 2

After mixing, sheeting and curing for 1½ hours at 150° C., a flexible, tough, leathery sheet with high tensile strength was obtained. The cured sheet had a hardness of 30 (Shore hardness).

*Example 5*

A flexible binder resin was prepared by reacting in the manner outlined in Example 4:

Parts by weight
Phenol _____ 10.1
Paraformaldehyde _____ 5.6
3.1 flexible alkyd resin (acid No. 180–210) __ 7.0

After boiling down under vacuum, a thick semi-liquid resin resulted. This resin was used with B and C-stage granulated 3½:1 flexible alkyd resin to make a compound as follows:

Parts by weight
C-stage flexible alkyd resin _____ 70
B-stage flexible alkyd resin _____ 5
Binder resin _____ 5
Barium sulphate (barytes) _____ 20

A gray flexible sheet resulted which could be calendered, molded and extruded. After calendering into a thin sheet 10–20 mils thick, wrapping several layers onto a mandrel to ⅛ to ¼ inch thickness, tightly binding with cotton sacrifice tape and curing 1 to 4 hours at 200° C., a homogeneous, flexible, oil-proof sleeving resulted.

*Example 6*

Using the same flexible binder resin described in Example 5, a compound was made from the following:

Parts by weight
15:1 C-stage adipic type flexible alkyd resin __ 77
Binder resin _____ 20
Litharge _____ 2
Zinc stearate _____ 1

An easily workable, flexible sheet resulted which could be sheeted, calendered, pressed, and molded. After curing for 1½ hours at 150° C. the product was a tan, leathery homogeneous compound.

It is apparent that the examples given above are merely illustrative as to proportions, ingredients, etc. to be used. For example, aqueous formaldehyde may be used in place of para-formaldehyde. Cresols, xylenols, hydroxydiphenyl, etc. can be used in place of phenol. Any of the known alkyd resins, for example, the fatty acid and oil-modified types, can be substituted for the alkyd resins used in the preparation of the compounds illustrated above.

What I claim as new and desire to secure by Letters Patent of the United States is:

1. The process which comprises compounding a totally cured resin formed from a mixture comprising a polyhydric alcohol having three or more hydroxyl groups in the molecule, a polybasic organic aromatic acid, a dihydric alcohol and a dibasic aliphatic acid; with a partially cured resin which has a cure point of 20–25 seconds at 150° C. and which is formed by reacting a phenol and an excess of aldehyde in the presence of a fusible, soluble acidic alkyd resin of acid number about 200; and curing the compounded mass at a temperature of 150°–200° C. to a homogeneous, flexible product.

2. The process which comprises compounding under heat and pressure totally cured resin formed by reacting a polyhydric alcohol having three or more hydroxyl groups in the molecule, a polybasic organic aromatic acid, a dihydric alcohol, and a dibasic aliphatic acid; with a partially cured resin which has a cure point of 20–25 seconds at 150° C. and which is formed by reacting a phenol and an excess of paraformaldehyde in the presence of a fusible, soluble acidic alkyd resin of acid number about 200 in proportions such that the compounded mass is quick curing to a flexible, water-resistant and oil-resistant product.

3. A flexible, plastic moldable composition comprising a totally cured resin formed from a mixture comprising a polyhydric alcohol having three or more hydroxyl groups in the molecule, a polybasic organic aromatic acid, a dihydric alcohol and a dibasic aliphatic acid; said totally cured resin being mixed with a relatively small proportion of binder comprising a partially cured resin which has a cure point of 20–25 seconds at 150° C. and which is formed by reacting a phenol and an excess of aldehyde in the presence of a fusible, soluble acidic alkyd resin of acid number about 200.

4. A flexible, oil-resistant and water-resistant composition comprising the product of cure under heat of the composition of claim 3.

5. A quick curing moldable composition comprising a mixture of fully cured flexible alkyd resin formed by reacting under heat glycerine, phthalic anhydride, glycol and adipic acid; and a relatively small proportion of binder comprising a partially cured resin which has a cure point of 20–25 seconds at 150° C. and which is formed by reacting a phenol and an excess of paraformaldehyde in the presence of a fusible, soluble acidic alkyd resin of acid number about 200.

6. The flexible, oil-resistant and water-resistant product of cure under heat of the composition of claim 5.

ROY H. KIENLE.